BIDIRECTIONAL SHIFT REGISTER

Filed Feb. 26, 1968

INVENTOR
JOHN E. CROY
BY [signature]
ATTORNEY

United States Patent Office 3,555,433
Patented Jan. 12, 1971

3,555,433
BIDIRECTIONAL SHIFT REGISTER

John E. Croy, Acton, Mass., assignor to RCA Corporation, a corporation of Delaware Filed Feb. 26, 1968, Ser. No. 708,298
Int. Cl. G11c 19/00
U.S. Cl. 328—37 4 Claims

ABSTRACT OF THE DISCLOSURE

Information is shifted to the right or left by emptying alternate stages of a storage circuit, shifting the remaining information one position in the desired direction, then returning the removed information to the stages from which the remaining information has been shifted.

BACKGROUND OF THE INVENTION

A bidirectional shift register well known in the art employs triggerable flip-flops and steering networks associated with each flip-flop. It is relatively expensive. Another form of shift register employs two storage elements per bit of stored information and during a shift cycle the information first is shifted from one element to the second element of that stage and then, during the second part of the shift cycle, is shifted from the second element to the first element of the following stage.

The object of this invention is to provide a shift register which is bidirectional, which is relatively simple and inexpensive, and which employs only about one and one-half storage elements per bit of stored information.

SUMMARY OF THE INVENTION

The shift register of the invention includes a first group of storage elements for storing the bits of a binary word, and a second group of storage elements having approximately half the number of elements as the first group. Information in alternate elements of the first group is temporarily stored in the second group of storage elements. The information remaining in the first group of storage elements is then shifted one position either to the right or to the left according to the direction of shifting desired. The information temporarily stored in the second group of elements is then returned to the first group of elements one position ahead of its former position, that is, one position displaced from its former position in the shift direction.

DETAILED DESCRIPTION

Figures 1, 2:
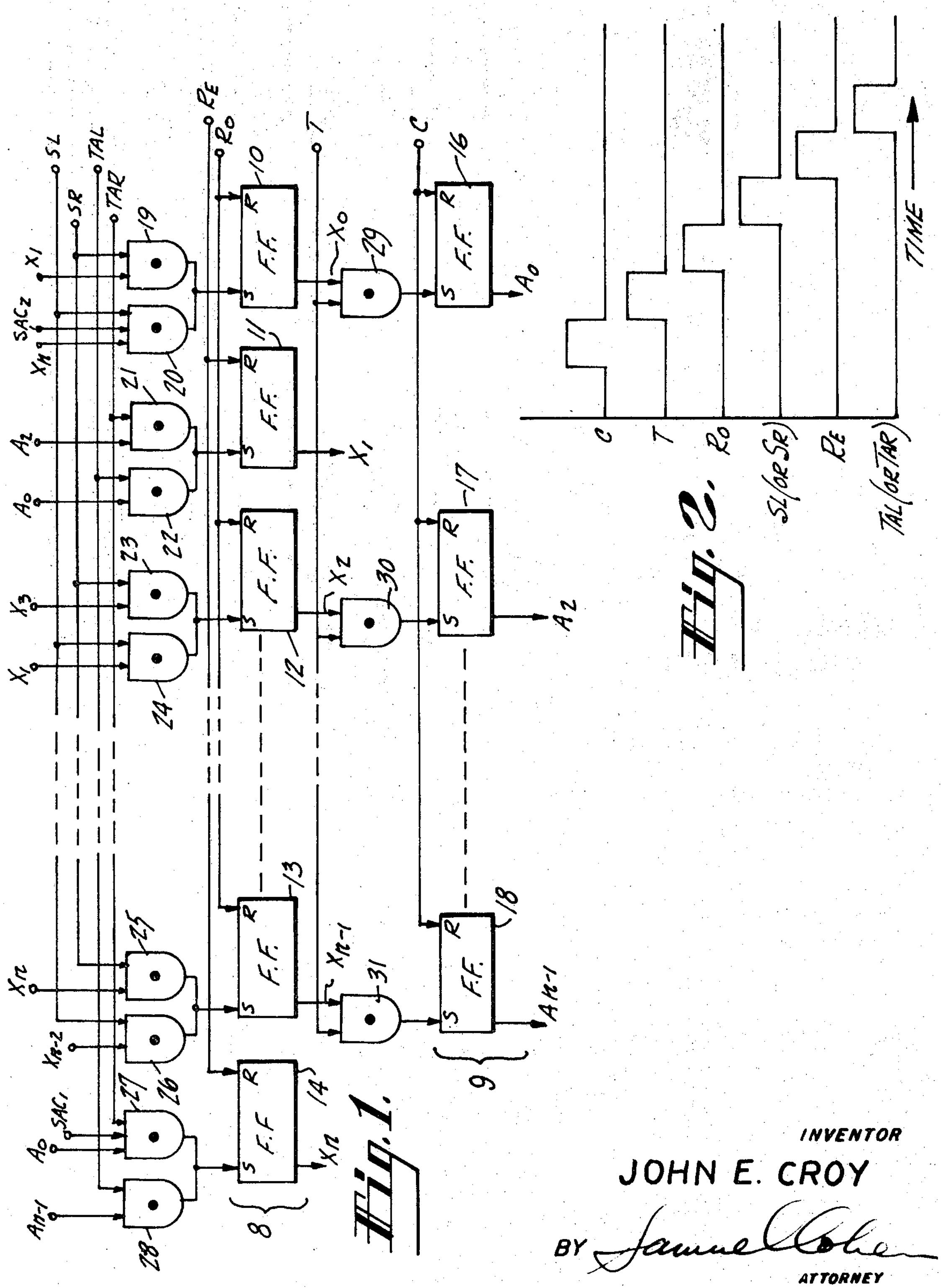
FIG. 1 is a block diagram of a bidirectional shift register according to the invention.
FIG. 2 is a drawing of waveforms present during the operation of the circuit of FIG. 1.

The circuit of FIG. 1 includes a first storage register 8 consisting of $n+1$ flip-flops five of which, 10–14 are shown. The actual number of flip-flops needed is equal to the number of bits in the word it is desired to store and may be odd or even. A second auxiliary register 9, consisting of $$\left[\frac{n+1}{2}\right]$$

flip-flops, three of which 16, 17, 18 are shown, is for the purpose of temporarily storing information. The brackets indicate that there is an integral number of stages and if a fraction is present within the brackets the integer is the next higher one which is possible. In other words, when there is an even number $n+1$ of stages in the register 8, there is exactly one half this number of stages in the auxiliary register 9. When there is an odd number $n+1$ of stages in register 8, there are $$\left[\frac{n+2}{2}\right]$$

stages in auxiliary register 9.

There are two AND gates per flip-flop of the first register 8 and one AND gate per flip-flop of the second register 9. These AND gates are identified by the numerals 19–31 in the figure.

In the operation of the shift register of FIG. 1, the auxiliary register 9 is first reset by applying the reset pulse C to the reset terminals R thereof. This pulse and the other control pulses are available from various timing and control circuits (not shown) of the digital system of which this register is a part. These pulses and their time relationship are shown in FIG. 2.

After the stages of the register 9 have been cleared, the control pulse T, representing the bit 1, is applied to the AND gates 29, 30 . . . 31 priming these gates. The information stored in the odd stages 10, 12 . . . 13 of the register 9 now passes through these AND gates to the auxiliary register 9 and is temporarily stored there.

The odd flip-flops 10, 12 . . . 13 are now cleared by applying the odd stage reset pulse $R_0$ to the reset terminals R of these stages. If now a shift to the left is desired, the shift left pulse SL is applied to AND gates 20, 24 . . . 26 for the odd stages, priming these gates. The information stored in the next stage to the right, if such a stage is present, now passes through the primed gate and is stored. For example, the bit $X_1$ stored in the second flip-flop 11 passes through AND gate 24 to the third flip-flop 12. Similarly, the bit stored in the flip-flop (not shown) immediately to the right of stage 13, that is, the bit $X_{n-2}$, passes through AND gate 26 to the flip-flop 13.

The first flip-flop 10, in this particular shift operation, is a special case. If a ring type shift is desired, the bit $X_n$ stored in the last flip-flop 14 should be shifted into the first flip-flop 10. For this type of operation, the shift around control pulse $SAC_2$ is made to represent the binary value 1 during the time $SL=1$ so that the signal $X_n$ indicative of the bit stored in the last flip-flop 14 passes through gate 20 and into the first flip-flop 10.

On the other hand, it may be desired to store a zero in the first stage when shifting to the left. In this case, during the operation just described, that is when $SL=1$, the control signal $SAC_2$ is made to have a value representative of the bit zero so that gate 20 remains disabled and cleared stage 10 remains cleared, representing storage of the bit zero. It is also possible, by the use of an additional circuit, unconditionally to store a one in the first stage rather than a zero during the period of pulse SL.

After the steps discussed above, the even stages of the register 8 such as 11 . . . 14, are cleared by applying the reset pulse RE.

Summarizing up to this point, the information stored in the odd stages is shifted to the auxiliary register 9, the odd stages are then cleared, the information in the even stages of the register 8 is then shifted to the left into the cleared odd stages, and the even stages are then cleared.

Now the information temporarily stored in register 9 is reinserted into the main register. This is done by applying the transfer left control pulse TAL which primes the AND gates 22 . . . 28. The primed AND gate 22 transfers the $A_0$ bit to the second flip-flop 11. The primed AND gate 28 transfers the $A_{n-1}$ bit to the flip-flop 14. The information stored in the successive stages of the main register, reading from right to left, now is $X_n$, $X_0$, $X_1$ . . . $X_{n-2}$, $X_{n-1}$, a ring shift of one place to the left, of the stored information.

The way in which information may be shifted to the right follows very closely the steps described above, however, the shift right control pulse SR is employed rather than the shift left control pulse SL and the transfer right control pulse TAR is employed rather than the transfer left control pulse TAL. Similarly, now the last stage 14 is a special case rather than a first stage. The ring shift around control pulse $SAC_1$ represents the value one when TAR=1 when a ring shift to the right is desired. For placing a zero in the last stage instead, $SAC_1$ is made equal to zero during the time TAR=1.

In both shift operations discussed above, each *i*th bit stored in the auxiliary register 9 is reinserted in the main register 8, one position "ahead" of its former position, that is, one position ahead in the shift direction, if there is a stage available to receive it. A special case occurs where the *i*th bit is the end bit (in the illustration, the $X_0$ bit). In the special case illustrated, when a ring shift right occurs, this bit $X_0$ from the first stage is reinserted in the last stage. Stated mathematically, in the case of a ring shift, each bit stored in the register 9 originating in the *i*th stage of register 8, is reinserted in the $i \oplus 1$th stage of register 8, where $\oplus$ represents modulo $n+1$ addition and is in the direction of the shift.

What is claimed is:

1. A bidirectional shift circuit comprising, in combination:
   - an *n* stage register;
   - means for removing the stored bits from alternate ones of said stages while retaining in the remaining stages the bits stored therein;
   - means for shifting the remaining bits in the register one position in either direction; and
   - means for returning to stages in the register, one position in the shift direction ahead of the stages in which they were initially stored,the bits removed from the register.

2. A bidirectional shift circuit comprising, in combination:
   - a main register having *n* storage elements, where *n* is an integer;
   - an auxiliary register having $[n/2]$ storage elements, where $[n/2]$ is an integer which is equal to $n/2$ when *n* is even and which is equal to $$\frac{n+1}{2}$$

when *n* is odd;
   - means for transferring the information stored in alternate elements of the main register into the auxiliary register;
   - means for shifting the non-transferred information remaining in the main register one position in a given direction; and
   - means for returning each bit stored in the auxiliary register to a position in the main register, when one is present, one element, in the shift direction, ahead of the element from which it was removed.

3. A bidirectional shift circuit comprising, in combination:
   - a main register having *n* storage elements, where *n* is an integer;
   - an auxiliary register having $[n/2]$ storage elements, where $[n/2]$ is an integer which is equal to $n/2$ when *n* is even and which is equal to $$\frac{n+1}{2}$$

when *n* is odd;
   - means for transferring the information stored in alternate elements of the main register into the auxiliary register;
   - means for shifting the non-transferred bit in each *i*th stage of the main register to the $i \oplus 1$th stage therein, in a given direction, where $\oplus$ refers to modulo *n* addition, and
   - means for returning each bit in the auxiliary register originally stored in the *j*th stage of the main register, to the $j \oplus 1$th stage of the main register, where $\oplus$ refers to modulo *n* addition and implies a direction which is the same as the shift direction.

4. A method for shifting in either direction the bits stored in a shift register comprising the steps of:
   - removing only the bits stored in alternate stages;
   - shifting the remaining bits in the register one position in the desired shift direction; and
   - returning to stages in the register, one position in the shift direction ahead of the stages in which they were initially stored, the bits removed from the register.

References Cited

UNITED STATES PATENTS

| | | | |
|---|---|---|---|
| 3,041,476 | 6/1962 | Parker | 307—221X |
| 3,348,066 | 10/1967 | Briley | 307—221X |
| 3,421,092 | 1/1969 | Bower et al. | 328—37 |

JOHN S. HEYMAN, Primary Examiner

U.S. Cl. X.R.

328—44